March 28, 1933.    W. R. HEWITT    1,903,216
PISTON
Filed Jan. 12, 1931
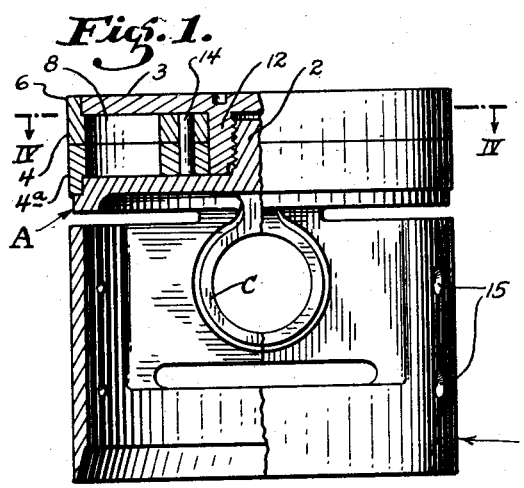
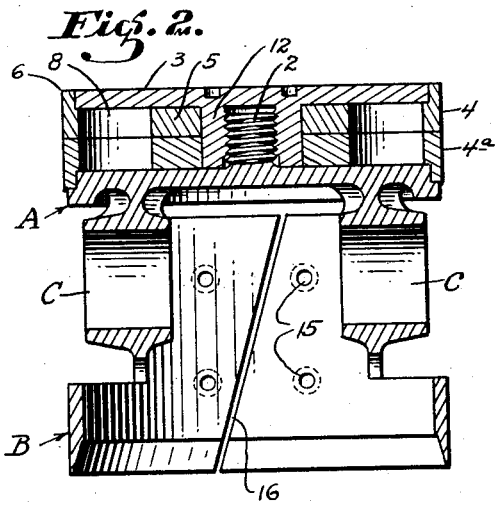
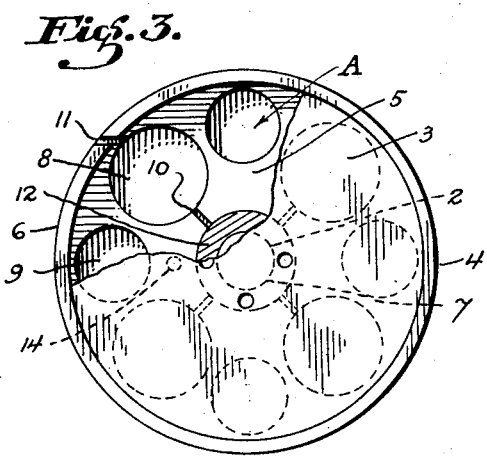
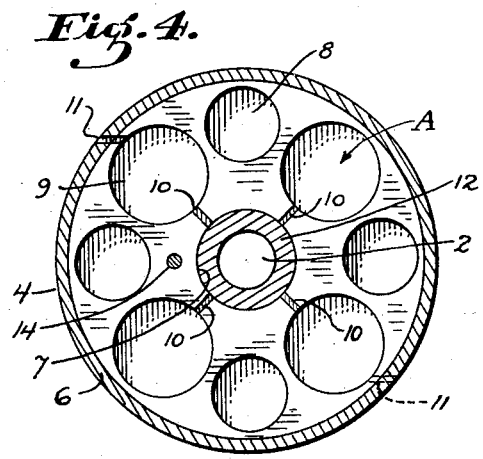
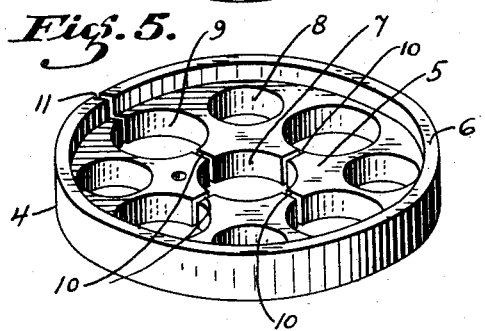
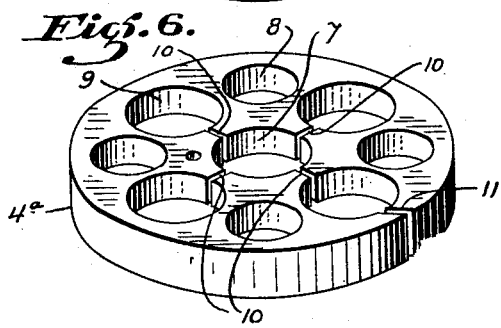
INVENTOR.
William R. Hewitt.
BY Townsend, Loftus & Abbett
ATTORNEYS.

Patented Mar. 28, 1933

1,903,216

UNITED STATES PATENT OFFICE

WILLIAM R. HEWITT, OF NEW YORK, N. Y.

PISTON

Application filed January 12, 1931. Serial No. 508,017.

This invention relates to a piston and especially to a piston which is intended for use in internal combustion engines.

Pistons commonly used in internal combustion engines consist of a head portion and a connected skirt portion which supports the wrist pin bosses. The head portion is provided with a plurality of circumferential grooves for the reception of snap rings and the natural expansion of the rings is depended upon to prevent leakage of gases during compression and firing. Snap rings of this character are as a rule full floating as there is no attempt to control their movement, hence their efficiency depends entirely upon the tension inherent in the metal employed. In the course of time, rings of this character lose their tension and become inefficient when it is necessary to replace them with new rings. At best, the area of contact of rings of this character with the walls of the cylinder is limited and especially so where the number of snap rings fitted to the piston are limited due to the design of the piston.

Another feature to be considered in connection with full floating rings is the fact that they form no support to receive or counteract the side thrust to which the piston is subjected during varying angular positions of the connecting rod; hence all side thrust must be taken up by the skirt subjecting this to excessive wear.

The object of the present invention is to generally improve and simplify the construction and operation of pistons of the character described; to provide a novel piston ring structure and mounting; to provide a piston ring whereby the contact area with relation to the cylinder wall may be greatly increased; to provide a pair of cooperating piston rings which are radially expansible and free to rotate circumferentially on the piston but locked against rotation with relation to each other; to provide mechanical and heat actuated expansion means for retaining the rings in contact with the cylinder wall; and, further, to provide a piston ring mounting whereby a portion of the side thrust transmitted to the piston will be supported by the rings.

The piston is shown by way of illustration in the accompanying drawing, in which—

Fig. 1 is a side elevation of the piston partially in section.

Fig. 2 is a central, vertical, longitudinal section of the piston taken at right angles to Fig. 1.

Fig. 3 is a plan view of the piston showing the cover plate partially broken away.

Fig. 4 is a transverse section taken on line IV—IV of Fig. 1.

Figs. 5 and 6 are perspective views of one of the piston rings showing opposite sides thereof.

Fig. 7 is a perspective view of the locking pin whereby the two piston rings are secured against rotation with relation to each other.

Referring to the drawing in detail and particularly Figs. 1 and 2, A indicates a head of the piston, B the skirt, and C the wrist pin bosses supported by the head and the skirt. The head is, in this instance, shown as provided with an upwardly extending threaded stud 2 and this forms a guide and securing means for a cover plate 3 and a pair of interposed piston rings 4 and 4a.

The piston rings are best shown in Figs. 5 and 6. Each ring is identical so the description of one should suffice. By referring to either Fig. 5 or 6, it will be noted that the piston ring consists of an inner plate or disc 5, on the outer peripheral edge of which is formed an annular upturned flange 6. The disc is provided with a central opening 7 and in order to make the disc or ring as a whole as light as possible it is drilled or cored out in a plurality of places as indicated at 8 and 9. The disc and flange is radially split as shown at 10 and 11 and as such may be contracted or expanded as will hereinafter be described.

The cover plate indicated at 3 is round and fits the inner surface of the upturned flange 6. The lower face of the cover plate is provided with a hub 12 and this is internally threaded to permit it to be secured with relation to the stud 2.

In actual practice the piston is constructed in the usual manner and may be formed of an alloy metal such as aluminum or the like.

The piston rings 4 and 4a are placed on top of the head as shown in Figs. 1 and 2 and they are there held in position by means of the cover plate, when this is screwed on over the stud 2. The hub member 12 bottoms against the head of the piston and as such has no clamping action on the rings. The rings are accordingly free to rotate between the head and the cover plate but they are locked against rotation with relation to each other by means of a locking pin such as shown at 14, see Figs. 1 and 7, holes being drilled in the discs to receive the pin 14. The only reason for locking the rings against rotation with relation to each other is to prevent the split portions 11 in the opposite rings from aligning. The holes drilled in the discs for the reception of the pin 14 are drilled on opposite sides of the central opening 7 so that when the rings are assembled as shown in Figs. 1 and 2 the split portions will be opposed to each other thus reducing gas leakage to a minimum. The hub member 12 serves two functions, first that of securing the cover plate with relation to the head of the piston and, secondly, that of acting as a support and as an expansion member for the rings. The hub is slightly larger in diameter than the central opening 7 formed in the disc of the respective rings, hence when the cover is applied and the hub enters the central openings 7 a slight expanding action is obtained and the rings are thus expanded to form a snug fit with relation to the cylinder in which they operate. The cover plate is preferably made of a metal having substantially the same co-efficient expansion as the cylinder walls, hence as the piston heats during actual work the hub 12 expands and this expanding movement is transmitted to gradually expand the rings so that these will automatically maintain a snug fit with relation to the cylinder wall as this heats and expands.

Another important function of the hub and cover plate is of course that of securing the rings against endwise movement with relation to the piston and, a further and more important function is that of forming a support for the rings. Piston rings as ordinarily fitted to pistons have a full floating movement, that is, they are not only free to rotate in the grooves but they may also move inwardly or outwardly in the grooves, hence they can only perform one function, to-wit, that of forming a seal or packing for the piston and as such it can readily be seen that they form no support for the piston when this is being subjected to side thrust such as produced when the connecting rod is passing through varying angular positions.

In the present instance side thrust is not only supported by the skirt portion of the piston but it is also supported by the rings as the rings are in turn supported by the hub member 12. The rings can not move inwardly between the head and the cover plate due to the hub member 12 and as such is the case they will support or absorb a portion of the side thrust to which the piston is subjected. This is an important feature as it permits material reduction in the length of the piston thereby lightening the weight thereof. Ordinary pistons depend entirely upon the skirt position to take up side thrust, hence a fairly long skirt is essential but as the rings in this instance support part of the side thrust the skirt can obviously be materially reduced in length.

In the present instance it will be noted that the discs are provided with annular flanges 6. The flange on the uppermost disc is turned upwardly and the flange on the lowermost disc downwardly. The head of the piston is recessed to receive the lower flange and the cover plate is reduced in diameter to fit within the upper flange. The provision of the flanges is important as it materially increases the contact area between the rings and the cylinder wall, in fact, it does not only increase the contact area but also the supporting area, hence insuring longer life and a better seal than can be obtained with ordinary rings. Replacement of ordinary piston rings is necessary the moment a certain amount of wear has taken place as the spring tension is not sufficient to retain them in engagement with the cylinder surface after a certain amount of wear has taken place. Furthermore, the spring tension decreases during actual use. Replacement of the rings due to wear is not necessary when using rings such as shown in the present application as the inherent spring tension of the metal is not depended upon. The hub member 12 holds the rings in working position and if the rings become circumferentially worn it is only necessary to apply a cover 3 having a slightly larger hub 12. This, when applied, will further expand the rings thus expanding them to the proper diameter. This displacement of the cover plate may be resorted to from time to time as necessity demands and the rings may thus be worn down until the flanges 6 are practically worn through.

The piston shown in the present instance may be materially reduced in weight due to the fact that the skirt portion may be materially shortened. It may be further reduced in weight by cutting away the skirt portion around the wrist pins as shown in Fig. 2 and by boring holes in the skirt portion as indicated at 15. This manner of boring holes does not only reduce weight but it also functions as a means of applying lubricating oil to the cylinder surface. The skirt may be split vertically as shown at 16 but this is obviously only necessary when the piston is constructed of an alloy having a comparatively high co-efficient expansion.

While certain features of the present invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is—

1. In a piston of the character described a ring comprising a disc-shaped member having a central opening formed therein, an annular flange formed on the peripheral edge of the disc, said disc having openings formed therein between the central opening and the flange, said flange and disc being split radially to permit expansion and contraction of the ring, and a combination supporting and expanding member insertable in the central opening.

2. For combination with a piston, a ring comprising a disc shaped member having a central opening formed therein, an annular flange formed on the peripheral edge of the disc, said disc having openings formed therein between the central opening and the flange, and said flange and disc being split radially to permit expansion and contraction of the ring.

3. A piston comprising a head portion, a disc-shaped ring disposed on top of the head and having an annular peripheral flange extending downwardly around the piston, a second ring disposed on top of the first ring and having an upwardly extending peripheral flange, said rings being provided with co-registering, central openings, a cover plate resting upon the said second ring and confined within the said flange thereof, and a hub member on said cover plate extending through said central openings and secured to the head portion of the piston.

WILLIAM R. HEWITT.